(12) United States Patent
Tarkin-Tas et al.

(10) Patent No.: US 11,111,336 B2
(45) Date of Patent: *Sep. 7, 2021

(54) POLY(PHENYLENE ETHER) COPOLYMER PROCESS AND COMPOSITIONS

(71) Applicant: SHPP GLOBAL TECHNOLOGIES B.V., Bergen op Zoom (NL)

(72) Inventors: Eylem Tarkin-Tas, Delmar, NY (US); Huseyin Tas, Delmar, NY (US); Mark R. Denniston, Altamont, NY (US)

(73) Assignee: SHPP GLOBAL TECHNOLOGIES B.V., Bergen op Zoom (NL)

( * ) Notice: Subject to any disclaimer, the term of this patent is extended or adjusted under 35 U.S.C. 154(b) by 0 days.

This patent is subject to a terminal disclaimer.

(21) Appl. No.: 16/497,553

(22) PCT Filed: Mar. 27, 2018

(86) PCT No.: PCT/US2018/024432
§ 371 (c)(1),
(2) Date: Sep. 25, 2019

(87) PCT Pub. No.: WO2018/194798
PCT Pub. Date: Oct. 25, 2018

(65) Prior Publication Data
US 2020/0199297 A1 Jun. 25, 2020

Related U.S. Application Data

(60) Provisional application No. 62/488,156, filed on Apr. 21, 2017.

(51) Int. Cl.
*C08G 65/44* (2006.01)
*C08G 65/40* (2006.01)
*C08L 71/12* (2006.01)

(52) U.S. Cl.
CPC ......... *C08G 65/44* (2013.01); *C08G 65/4087* (2013.01); *C08G 65/4093* (2013.01); *C08L 71/123* (2013.01)

(58) Field of Classification Search
CPC ..... C08F 20/06; C07D 303/12; C08G 81/025; C08G 65/4087; C07C 39/17
See application file for complete search history.

(56) References Cited

U.S. PATENT DOCUMENTS

| | | | |
|---|---|---|---|
| 3,306,874 A | 2/1967 | Hay | |
| 3,306,875 A | 2/1967 | Hay | |
| 3,789,054 A | 1/1974 | Izawa et al. | |
| 3,923,738 A | 12/1975 | Van Sorge | |
| 4,463,164 A | 7/1984 | Dalton et al. | |
| 6,962,744 B2 | 11/2005 | Amagai et al. | |
| 7,541,421 B2 | 6/2009 | Carrillo et al. | |
| 7,638,566 B2 | 12/2009 | Braidwood et al. | |
| 8,058,359 B2 | 11/2011 | Irwin | |
| 2005/0065241 A1 | 3/2005 | Ishii et al. | |
| 2005/0070685 A1 | 3/2005 | Mitsui et al. | |
| 2008/0071035 A1 | 3/2008 | Delsman et al. | |
| 2008/0076884 A1 | 3/2008 | Yeager et al. | |
| 2008/0076885 A1 | 3/2008 | Yeager et al. | |
| 2008/0085989 A1 | 4/2008 | Yeager et al. | |
| 2008/0178983 A1 | 7/2008 | Braidwood et al. | |
| 2009/0012331 A1* | 1/2009 | Nakano | C08G 65/44 568/658 |

FOREIGN PATENT DOCUMENTS

| | | |
|---|---|---|
| EP | 0550209 A2 | 7/1993 |
| JP | 2008063537 A | 3/2008 |
| WO | 2008036454 A1 | 3/2008 |
| WO | 2008103599 A3 | 8/2008 |

OTHER PUBLICATIONS

AICHE.org, [online]; www3.aiche.org/Proceedings/content/Annual-2013/extended-abstracts/P342189.pdf, E.N. Peters, A. Carrillo, S.M. Fisher, "Polyphenylene Ether Macromonomers," AICHE, Annual Proceed. P342189, 2013, 8 pages.
International Search Report; International Application No. PCT/US2018/024429; International Filing Date Mar. 27, 2018; dated Jul. 4, 2018; 5 pages.
International Search Report; International Application No. PCT/US2018/024432; International Filing Date Mar. 27, 2018; dated Jul. 4, 2018; 6 pages.
Liu et al.; "Mechanism of the Particle Formation During the Oxidative Polymerization of 2,6-Dimethylphenol in an Aqueous Medium"; Journal of Applied Polymer Science; vol. 104; pp. 3649-3653 (2007).
Saito et al.; "Oxidative Polymerization of 2,6-Dimethylphenol to Form Poly(2,6-dimethyl-1,4-phenyleneoxide) in Water"; Agnew. Chem. Int. Ed. 2004; 43; pp. 730-733.
White et al. "Polymerization by Oxidative coupling. IV. Synthesis and Properties of Poly(2-methyl-6-phenylphenylene ether)"; Journal of Polymer Science; Part A-1, Polymer Chemistry; vol. 10, No. 6; Jun. 1, 1972; pp. 1565-1578.
Written Opinion of the International Searching Authority; International Application No. PCT/US2018/024429; International Filing Date Mar. 27, 2018; dated Jul. 4, 2018; 8 pages.
Written Opinion of the International Searching Authority; International Application No. PCT/US2018/024432; International Filing Date Mar. 27, 2018; dated Jul. 4, 2018; 9 pages.

* cited by examiner

*Primary Examiner* — Shane Fang
(74) *Attorney, Agent, or Firm* — Cantor Colburn LLP

(57) ABSTRACT

A poly(phenylene ether) copolymer of 2-methyl-6-phenylphenol and a dihydric phenol having an absolute number average molecular weight of 1,000 to 10,000 grams/mole is made by polymerization of 2-methyl-6-phenylphenol and a dihydric phenol in the presence of molecular oxygen, a polymerization catalyst comprising a metal ion and at least one amine ligand, and a solvent composed of at least 95 weight percent of a $C_1$-$C_3$ alcohol selected from methanol, ethanol, 1-propanol, and 2-propanol. The poly(phenylene ether) copolymer can be, for example, a copolymer of 2-methyl-6-phenylphenol, 2,2-bis(3,5-dimethyl-4-hydroxyphenol)propane, and optionally 2,6-dimethylphenol. The poly(phenylene ether) copolymer finds utility in curable compositions, cured compositions, and articles.

18 Claims, No Drawings

POLY(PHENYLENE ETHER) COPOLYMER PROCESS AND COMPOSITIONS

CROSS REFERENCE TO RELATED APPLICATIONS

This application is a National Stage application of PCT/US2018/024432, filed Mar. 27, 2018, which claims the benefit of U.S. Provisional Application No. 62/488,156, filed Apr. 21, 2017, both of which are incorporated by reference in their entirety herein.

BACKGROUND

Poly(phenylene ether)s are a class of thermoplastics known for excellent water resistance, dimensional stability, and inherent flame retardancy, as well as outstanding dielectric properties over wide frequency and temperature ranges. Properties such as ductility, stiffness, chemical resistance, and heat resistance can be tailored by blending poly(phenylene ether)s with various other plastics in order to meet requirements of a wide variety of end uses, for example, fluid engineering parts, electrical enclosures, automotive parts, and insulation for wire and cable. In addition, poly(phenylene ether)s have been used in thermoset compositions for electronics applications, where they provide improved toughness and dielectric properties, among other benefits.

Use of poly(phenylene ether)s in thermoset compositions has revealed various trade-offs. High molecular weight poly(phenylene ether)s can provide superior toughness and dielectric properties, but their use is associated with processing challenges including limited solubility in common solvents used in the thermoset industry, and high viscosity of resulting solutions. Low molecular weight poly(phenylene ether)s exhibit improved solubility and lower solution viscosity, but pose challenges in synthesis and isolation relative to high molecular weight poly(phenylene ether)s.

Synthesis of poly(phenylene ether)s by oxidative coupling of monohydric phenols has long been known. See, e.g., U.S. Pat. No. 3,306,874 to Hay, issued 28 Feb. 1967. In one synthetic process, oxidative coupling is carried out in the presence of a solvent that dissolves the monohydric phenol monomer, the polymerization catalyst, and the product poly(phenylene ether). This synthetic method also requires removal of polymerization catalyst from the reaction product solution, which is generally followed by precipitation of the product poly(phenylene ether) by combining its solution with a non-solvent. In short, this synthetic process requires a) reaction, b) removal of catalyst, and c) isolation of polymer. Synthesis of low molecular weight poly(phenylene ether)s can be carried out in a similar manner. The molecular weight of the polymer can be controlled by adjusting factors including catalyst concentration, polymerization time, and concentration of a dihydric phenol comonomer (if present).

In an alternative synthetic process, oxidative coupling is carried out in the presence of a solvent that dissolves the monohydric phenol monomer and the polymerization catalyst, but not the product poly(phenylene ether). In this method, the molecular weight of the product poly(phenylene ether) can be controlled by adjusting factors including the composition of a solvent blend. For example, Example 27 of U.S. Pat. No. 3,306,875 to Hay, issued 28 Feb. 1967, illustrates oxidative polymerization of 2,6-dimethylphenol in a 13:7 volume/volume mixture of benzene and n-heptane, yielding a poly(phenylene ether) having an intrinsic viscosity of 0.49 deciliter per gram. As another example, U.S. Pat. No. 4,463,164 to Dalton et al. describes synthesis of poly(phenylene ether)s by oxidatively coupling monohydric phenol in a liquid medium that is a solvent for the monomer and catalyst, and a non-solvent for the poly(phenylene ether). Product poly(phenylene ether)s had absolute number average molecular weights of 13,200 to 31,000 grams per mole.

Hybrids of the two synthetic processes are also known. For example, U.S. Pat. No. 3,789,054 to Izawa et al. describes a process for polymerization of 2,6-disubstituted phenols by preparing a 15 to 35 weight percent solution of 2,6-disubstituted phenol in dimethylformamide or in a mixed solvent composed of toluene and methanol, subjecting the solution to polymerization in one zone while maintaining the reaction mixture as a homogeneous solution, and transferring the polymerization liquid to another zone to complete the polymerization while allowing the resulting polymer to precipitate. The method is described as capable of producing poly(phenylene ether)s having an intrinsic viscosity of at least 0.25 deciliter per gram, and the poly(phenylene ether)s produced in the working examples having intrinsic viscosities ranging from 0.44 to 0.77 deciliter per gram in chloroform at 25° C.

There remains a need for a process of preparing low molecular weight poly(phenylene ether), where the process reduces chemical incorporation of dialkylamine cocatalysts into the poly(phenylene ether), simplifies purification and isolation steps, and eliminates the requirement for multiple solvents to isolate the poly(phenylene ether).

BRIEF SUMMARY OF EMBODIMENTS

A process for forming a poly(phenylene ether) copolymer comprises: reacting a monohydric phenol comprising 2-methyl-6-phenylphenol and a dihydric phenol in the presence of molecular oxygen, a polymerization catalyst comprising a metal ion and at least one amine ligand, and a solvent to form a copolymer of 2-methyl-6-phenylphenol and the dihydric phenol; wherein the copolymer has an absolute number average molecular weight of 1,000 to 10,000 grams/mole; and wherein the solvent comprises, based on the total weight of the solvent, at least 95 weight percent of a $C_1$-$C_3$ alcohol selected from the group consisting of methanol, ethanol, 1-propanol, and 2-propanol.

A poly(phenylene ether) copolymer is derived from a monohydric phenol comprising 2-methyl-6-phenylphenol and a dihydric phenol, and has an absolute number average molecular weight of 1,000 to 10,000 grams/mole. The copolymer can be made by the process described herein. The poly(phenylene ether) copolymer can have the structure:

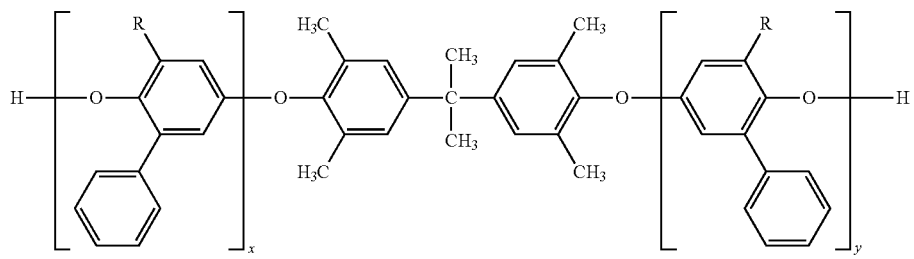

wherein: R is independently at each occurrence methyl or di(n-butyl)aminomethyl; provided that the copolymer comprises, on average, less than or equal to 0.005 weight percent of di(n-butyl)aminomethyl groups, based on the weight of the copolymer; and x and y are independently at each occurrence zero to 50, provided that the sum of x and y is 4 to 53.

A curable composition comprises a thermosetting resin and the poly(phenylene ether) copolymer described herein. A cured composition is obtained by heating the curable composition for a time and temperature sufficient to effect curing, and articles can comprise the cured composition.

These and other embodiments are described in detail below.

DETAILED DESCRIPTION

The present inventors have determined that a low molecular weight poly(phenylene ether) can be prepared by oxidative coupling of a monohydric phenol and a dihydric phenol using a molecular oxygen-containing gas in the presence of a catalyst comprising a copper salt and an amine, and a non-solvent for the poly(phenylene ether). The resulting solid-liquid reaction mixture contains poly(phenylene ether) particles that can be separated from the liquid phase and treated to remove catalyst residue. The separated liquid phase can be re-used in the polymerization. Advantageously, poly(phenylene ether) produced by this process have reduced chemical incorporation of dialkylamine groups into the poly(phenylene ether).

The process for forming a poly(phenylene ether) copolymer, comprises: reacting a monohydric phenol comprising 2-methyl-6-phenylphenol and a dihydric phenol in the presence of molecular oxygen, a polymerization catalyst comprising a metal ion and at least one amine ligand, and a solvent to form a copolymer of 2-methyl-6-phenylphenol and the dihydric phenol; wherein the copolymer has an absolute number average molecular weight of 1,000 to 10,000 grams/mole; and wherein the solvent comprises, based on the total weight of the solvent, at least 95 weight percent of a $C_1$-$C_3$ alcohol selected from the group consisting of methanol, ethanol, 1-propanol, and 2-propanol.

The poly(phenylene ether) copolymer is formed by polymerization of monomers comprising 2-methyl-6-phenylphenol and dihydric phenol by continuous addition of oxygen to a reaction mixture comprising the monomers, solvent, and polymerization catalyst. The molecular oxygen ($O_2$) can be provided as air or pure oxygen. The polymerization catalyst is a metal complex comprising a transition metal cation. The metal cation can include ions from Group VIB, VIIB, VIIIB, or IB of the periodic table, and combinations thereof. Of these, chromium, manganese, cobalt, copper, and combinations comprising at least one of the foregoing ions can be used. In some embodiments, the metal ion is copper ion ($Cu^+$ and $Cu^{2+}$). Metal salts which can serve as sources of metal cations include cuprous chloride, cupric chloride, cuprous bromide, cupric bromide, cuprous iodide, cupric iodide, cuprous sulfate, cupric sulfate, cuprous tetraamine sulfate, cupric tetraamine sulfate, cuprous acetate, cupric acetate, cuprous propionate, cupric butyrate, cupric laurate, cuprous palmitate, cuprous benzoate, and the corresponding manganese salts and cobalt salts. Instead of use of any of the above-exemplified metal salts, it is also possible to add a metal or a metal oxide and an inorganic acid, organic acid or an aqueous solution of such an acid and form the corresponding metal salt or hydrate in situ. For example, cuprous oxide and hydrobromic acid can be added to generate cuprous bromide in situ.

The polymerization catalyst further comprises at least one amine ligand. The amine ligand can be, for example, a monoamine, an alkylene diamine, or a combination comprising at least one of the foregoing. Monoamines include dialkylmonoamines (such as di-n-butylamine, or DBA) and trialkylmonoamines (such as N,N-dimethylbutylamine, or DMBA). Diamines include alkylenediamines, such as N,N-di-tert-butylethylenediamine, or DBEDA. Suitable dialkylmonoamines include dimethylamine, di-n-propylamine, di-n-butylamine, di-sec-butyl amine, di-tert-butylamine, dipentylamine, dihexylamine, dioctylamine, didecylamine, dibenzylamine, methylethylamine, methylbutylamine, dicyclohexylamine, N-phenylethanolamine, N-(p-methyl)phenylethanolamine, N-(2,6-dimethyl)phenylethanolamine, N-(p-chloro)phenylethanolamine, N-ethylaniline, N-butyl aniline, N-methyl-2-methylaniline, N-methyl-2,6-dimethylaniline, diphenylamine, and the like, and combinations thereof. Suitable trialkylmonoamines include trimethylamine, triethylamine, tripropylamine, tributylamine, butyldimethylamine, phenyldiethylamine, and the like, and combinations thereof.

Suitable alkylenediamines include those having the formula

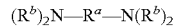

wherein $R^a$ is a substituted or unsubstituted divalent residue; and each $R^b$ is independently hydrogen or $C_1$-$C_8$ alkyl. In some examples, of the above formula, two or three aliphatic carbon atoms form the closest link between the two diamine nitrogen atoms. Specific alkylenediamine ligands include those in which $R^a$ is dimethylene (—$CH_2CH_2$—) or trimethylene (—$CH_2CH_2CH_2$—). $R^b$ can be independently hydrogen, methyl, propyl, isopropyl, butyl, or a $C_4$-$C_8$ alpha-tertiary alkyl group. Examples of alkylenediamine ligands include N,N,N',N' tetramethylethylene diamine (TMED), N,N'-di-tert-butylethylenediamine (DBEDA), N,N,N',N'-tetramethyl-1,3-diaminopropane (TMPD), N-methyl-1,3-diaminopropane, N,N'-dimethyl-1,3-diaminopropane, N,N,N-dimethyl-1,3-diaminopropane, N-ethyl-1,3-diaminopropane, N-methyl-1,4-diaminobutane, N,N'-trimethyl-1,4-diaminobutane, N,N,N'-trimethyl-1,4-diaminobutane, N,N,N',N'-tetramethyl-1,4-diaminobutane, N,N,N',N'-tetramethyl-1,5-diaminopentane, and combinations thereof. In some embodiments, the amine ligand is selected from di-n-butylamine (DBA), N,N-dimethylbutylamine (DMBA), N,N'-di-tert-butylethylenediamine (DBEDA), and combinations thereof. The catalyst can be prepared in situ by mixing a metal ion source (e.g., cuprous oxide and hydrobromic acid) and amine ligands. In some embodiments, the polymerization catalyst comprises copper ion, bromide ion, and N,N'-di-tert-butylethylenediamine.

The solvent comprises, based on the total weight of the solvent, at least 95 weight percent of a $C_1$-$C_3$ alcohol selected from the group consisting of methanol, ethanol, 1-propanol, and 2-propanol. Within this range, the solvent can comprise at least 98, 99, or 99.9 weight percent of the $C_1$-$C_3$ alcohol. The solvent can comprise less than 5 weight percent, specifically less than 2, 1, or 0.1 weight percent of a solvent other than the $C_1$-$C_3$ alcohol. For example, the solvent other than the $C_1$-$C_3$ alcohol can comprise water introduced as a solution of the metal ion, for example $Cu_2O$, or toluene introduced as a solution of an amine ligand, for example di-tert-butylethylenediamine. In some embodiments, the $C_1$-$C_3$ alcohol is methanol, and the solvent comprises at least 99 weight percent methanol.

Advantageously, monomers comprising 2-methyl-6-phenylphenol and dihydric phenol are soluble in the $C_1$-$C_3$ alcohol selected from the group consisting of methanol, ethanol, 1-propanol, and 2-propanol, but the poly(phenylene ether) copolymer formed by polymerization of 2-methyl-6-phenylphenol and dihydric phenol is insoluble in the $C_1$-$C_3$ alcohol. Therefore the poly(phenylene ether) copolymer precipitates as it is formed, which limits the absolute number average molecular weight. When a poly(phenylene ether) is prepared by homogeneous polymerization in a poly(phenylene ether) solvent, for example toluene, the poly(phenylene ether), the polymerization solution must be diluted with a non-solvent to precipitate the poly(phenylene ether). Advantageously, since the poly(phenylene ether) copolymer precipitates during polymerization in the present process, a subsequent precipitation step is completely avoided. Not only does this eliminate a process step, but the high energy costs associated with distillation of a solvent mixture to recover the individual solvents (solvent and non-solvent) are avoided.

The poly(phenylene ether) copolymer can comprise 80 to 99 weight percent of repeat units derived from the monohydric phenol and 1 to 20 weight percent of repeat units derived from the dihydric phenol. Within this range, the poly(phenylene ether) copolymer can comprise 85 to 95 weight percent repeat units derived from the monohydric phenol and 5 to 15 weight percent repeat units derived from the dihydric phenol.

The dihydric phenol can have the structure:

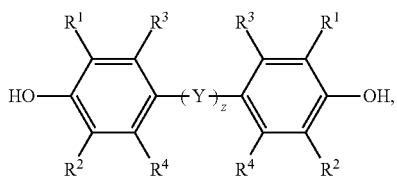

wherein each occurrence of $R^1$ and $R^2$ and $R^3$ and $R^4$ is independently selected from the group consisting of hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, and $C_2$-$C_{12}$ halohydrocarbyloxy wherein at least two carbon atoms separate the halogen and oxygen atoms; z is 0 or 1; and Y is selected from the group consisting of:

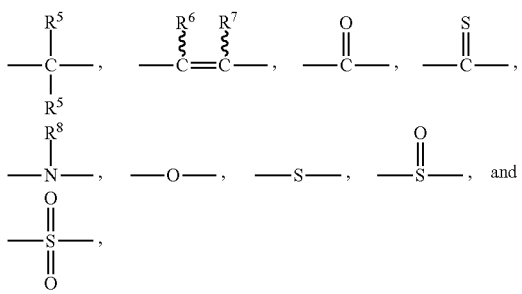

wherein each occurrence of $R^5$-$R^8$ is independently hydrogen, $C_1$-$C_{12}$ hydrocarbyl, or $C_1$-$C_6$ hydrocarbylene wherein the two occurrences of $R^5$ collectively form a $C_4$-$C_{12}$ alkylene group. In some embodiments, z is 1. Examples of dihydric phenols include 3,3',5,5'-tetramethyl-4,4'-biphenol, 2,2-bis(3-methyl-4-hydroxyphenyl)propane, 2,2-bis(3,5-dimethy-4-hydroxyphenyl)propane, 1,1-bis(4-hydroxyphenyl)methane, 1,1-bis(4-hydroxyphenyl)ethane, 2,2-bis(4-hydroxyphenyl)propane, 2,2-bis(4-hydroxyphenyl)butane, 2,2-bis(4-hydroxyphenyl)octane, 1,1-bis(4-hydroxyphenyl)propane, 1,1-bis(4-hydroxyphenyl)-n-butane, bis(4-hydroxyphenyl)phenylmethane, 2,2-bis(4-hydroxy-3-methylphenyl)propane, 1,1-bis(4-hydroxy-3-methylphenyl)cyclohexane, 1,1-bis(4-hydroxy-3,5-dimethylphenyl)cyclopentane, 1,1-bis(4-hydroxy-3-methylphenyl)cyclohexane, 1,1-bis(4-hydroxy-3,5-dimethylphenyl)cycloheptane, 1,1-bis(4-hydroxy-3-methylphenyl)cycloheptane, 1,1-bis(4-hydroxy-3,5-dimethylphenyl)cyclooctane, 1,1-bis(4-hydroxy-3-methylphenyl)cyclooctane, 1,1-bis(4-hydroxy-3,5-dimethylphenyl)cyclononane, 1,1-bis(4-hydroxy-3-methylphenyl)cyclononane, 1,1-bis(4-hydroxy-3,5-dimethylphenyl)cyclodecane, 1,1-bis(4-hydroxy-3-methylphenyl)cyclodecane, 1,1-bis(4-hydroxy-3,5-dimethylphenyl)cycloundecane, 1,1-bis(4-hydroxy-3-methylphenyl)cycloundecane, 1,1-bis(4-hydroxy-3,5-dimethylphenyl)cyclododecane, 1,1-bis(4-hydroxy-3-methylphenyl)cyclododecane, 1,1-bis(4-hydroxy-3-t-butylphenyl)propane, 2,2-bis(4-hydroxy-2,6-dimethylphenyl)propane, 2,2-bis(4-hydroxy-3-bromophenyl)propane, 1,1-bis(4-hydroxyphenyl)cyclopentane, 1,1-bis(4-hydroxyphenyl)cyclohexane, 2,2',6,6'-tetramethyl-3,3',5,5'-tetrabromo-4,4'-biphenol, 2,2',5,5'-tetramethyl-4,4'-biphneol or a combination comprising at least one of the foregoing. In some embodiments, the dihydric phenol comprises 2,2-bis(3,5-dimethyl-4-hydroxyphenol)propane.

The absolute number average molecular weight of the poly(phenylene ether) copolymer is 1,000 to 10,000 grams per mole. Within this range, the absolute number average molecular weight can be greater than or equal to 1,500, 2,000, or 2,700 grams per mole, and less than or equal to 8,000, 5,000, 4,000, or 3,000 grams per mole. In some embodiments, the copolymer has an absolute number average molecular weight of 1,000 to 5,000 grams/mole, specifically 1,000 to 4,000, 1,000 to 3,000 or 2,700 to 3,000 grams/mole.

In some embodiments of the process, the monohydric phenol comprises, based on the total weight of monohydric phenol and dihydric phenol, less than 0.5 weight percent of monohydric phenols having identical substituents in the 2- and 6-positions of the phenolic ring. Within this range, the monomer can comprise less than or equal to 0.1 weigh percent or zero monohydric phenols having identical substituents in the 2- and 6-positions of the phenolic ring. In some embodiments the monohydric phenol having identical substituents in the 2- and 6-positions of the phenolic ring is 2,6-dimethylphenol or 2,6-diphenylphenol.

When the amine ligand comprises a secondary amine such as di-n-butylamine, some of the secondary amine is chemically incorporated into the poly(phenylene ether) at the benzylic position of terminal monohydric phenol units. The covalently bound monoamine groups are present as aminomethyl groups ortho to the phenol oxygen in terminal units as indicated below:

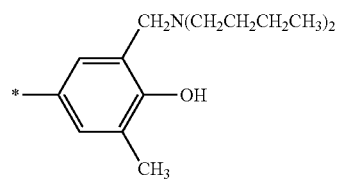

The amount of covalently bound monoamine groups can be determined by $^1$H-NMR spectroscopy. Covalently bound monoamine groups can adversely affect the oxidative stability of poly(phenylene ether), and can result in yellowing of the poly(phenylene ether) upon heat aging. Advantageously, the process results in reduced incorporation of secondary monoamine into the poly(phenylene ether) copolymer in comparison to process in which the poly(phenylene ether) copolymer is produced by homogeneous solution polymerization. Thus, when amine ligand comprises a di($C_1$-$C_6$-alkyl)amine, the copolymer of 2-methyl-6-phenylphenol and the dihydric phenol comprises less than 0.005 weight percent of di($C_1$-$C_6$-alkyl)amino groups, based on the weight of the copolymer.

In some embodiments, the dihydric phenol comprises 2,2-bis(3,5-dimethyl-4-hydroxyphenol)propane; the at least on amine ligand comprises di(n-butyl)amine; the solvent comprises at least 99 weight percent methanol; a copolymer of 2-methyl-6-phenylphenol and 2,2-bis(3,5-dimethyl-4-hydroxyphenol)propane is formed by the process; and the copolymer comprises less than 0.005 weight percent of di(n-butyl)amino groups, based on the weight of the copolymer.

Also disclosed are poly(phenylene ether) copolymers made by the process described herein. Thus, a poly(phenylene ether) copolymer is derived from a monohydric phenol comprising 2-methyl-6-phenylphenol and a dihydric phenol, and has an absolute number average molecular weight of 1,000 to 10,000 grams/mole. Within this range, the absolute number average molecular weight can be greater than or equal to 1,500, 2,000, or 2,700 grams per mole, and less than or equal to 8,000, 5,000, 4,000, or 3,000 grams per mole. In some embodiments, the poly(phenylene ether) copolymer has an absolute number average molecular weight of 1,000 to 5,000 grams/mole, specifically 1,000 to 4,000, 1,000 to 3,000 or 2,700 to 3,000 grams/mole. For example, the monohydric phenol can be a combination of 2-methyl-6-phenylphenol and 2,6-dimethylphenol, and the poly(phenylene ether) can be a terpolymer of 2-methyl-6-phenylphenol, 2,6-dimethylphenol, and 2,2-bis(3,5-dimethyl-4-hydroxyphenol)propane having an absolute number average molecular weight of 1,000 to 3,000 grams/mole. Absolute number average molecular weight is determined by $^1$H-NMR as described in the Working Examples section. It is calculated from the integrated areas under the resonance peaks in $^1$H-NMR spectra of the poly(phenylene ether) copolymers, which are proportional to the molar concentration of the species corresponding to the peaks.

The poly(phenylene ether) copolymer can comprise 80 to 99 weight percent of repeat units derived from the monohydric phenol and 1 to 20 weight percent of repeat units derived from the dihydric phenol. Within this range, the poly(phenylene ether) copolymer can comprise 85 to 95 weight percent repeat units derived from the monohydric phenol and 5 to 15 weight percent repeat units derived from the dihydric phenol.

In some embodiments of the poly(phenylene ether) copolymer, the monohydric phenol comprises, based on the total weight of monohydric phenol and dihydric phenol, less than 0.5 weight percent of monohydric phenols having identical substituents in the 2- and 6-positions of the phenolic ring. Within this range, the monohydric phenol can comprise less than or equal to 0.1 weigh percent or zero monohydric phenols having identical substituents in the 2- and 6-positions of the phenolic ring. In some embodiments the monohydric phenol having identical substituents in the 2- and 6-positions of the phenolic ring is 2,6-dimethylphenol or 2,6-diphenylphenol.

In some embodiments, the poly(phenylene ether) copolymer has the structure:

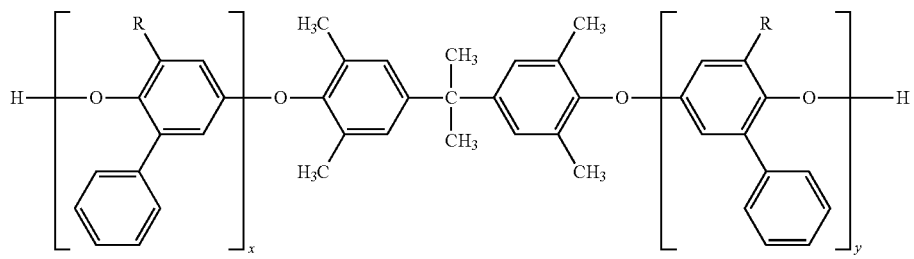

wherein: R is independently at each occurrence methyl or di(n-butyl)aminomethyl; provided that the copolymer comprises, on average, less than or equal to 0.005 weight percent of di(n-butyl)aminomethyl groups, based on the weight of the copolymer; and x and y are independently at each occurrence zero to 50, provided that the sum of x and y is 4 to 53. In some embodiments of the above poly(phenylene ether) copolymer, the sum of x and y is 8 to 20.

Being bifunctional, with two reactive phenolic groups, the poly(phenylene ether) copolymer is ideally suited as a reactive component in curable compositions comprising a thermoset resin. Thus a curable composition comprises a thermoset resin, the poly(phenylene ether) copolymer described herein. The thermoset resin can be, for example, an epoxy resin, a cyanate ester resin, a bismaleimide resin, a polybenzoxazine resin, a vinyl resin, a phenolic resin, an alkyd resin, an unsaturated polyester resin, or a combination comprising at least one of the foregoing thermoset resins. Epoxy resins useful as thermoset resins can be produced by reaction of phenols or polyphenols with epichlorohydrin to form polyglycidyl ethers. Examples of useful phenols for production of epoxy resins include substituted bisphenol A, bisphenol F, hydroquinone, resorcinol, tris-(4-hydroxyphenyl)methane, and novolac resins derived from phenol or o-cresol. Epoxy resins can also be produced by reaction of aromatic amines, such as p-aminophenol or methylenedianiline, with epichlorohydrin to form polyglycidyl amines.

Epoxy resins can be converted into solid, infusible, and insoluble three dimensional networks by curing with crosslinkers, often called curing agents, or hardeners. Curing agents are either catalytic or coreactive. Coreactive curing agents have active hydrogen atoms that can react with epoxy groups of the epoxy resin to form a cross-linked resin. The active hydrogen atoms can be present in functional groups comprising primary or secondary amines, phenols, thiols, carboxylic acids, or carboxylic acid anhydrides. Examples of coreactive curing agents for epoxy resins include aliphatic and cycloaliphatic amines and amine-functional adducts with epoxy resins, Mannich bases, aromatic amines, polyamides, amidoamines, phenalkamines, dicyandiamide, polycarboxylic acid-functional polyesters, carboxylic acid anhydrides, amine-formaldehyde resins, phenol-formaldehyde resins, polysulfides, polymercaptans, and combinations comprising at least one of the foregoing coreactive curing agents. A catalytic curing agent functions as an initiator for epoxy resin homopolymerization or as an accelerator for coreactive curing agents. Examples of catalytic curing agents include tertiary amines, such as 2-ethyl-4-methylimidazole, Lewis acids, such as boron trifluoride, and latent cationic cure catalysts, such as diaryliodonium salts.

The thermoset resin can be a cyanate ester. Cyanate esters are compounds having a cyanate group (—O—C≡N) bonded to carbon via the oxygen atom, i.e. compounds with C—O—C≡N groups. Cyanate esters useful as thermoset resins can be produced by reaction of a cyanogen halide with a phenol or substituted phenol. Examples of useful phenols include bisphenols utilized in the production of epoxy resins, such as bisphenol A, bisphenol F, and novolac resins based on phenol or o-cresol. Cyanate ester prepolymers are prepared by polymerization/cyclotrimerization of cyanate esters. Prepolymers prepared from cyanate esters and diamines can also be used. The thermoset resin can be a bismaleimide. Bismaleimide resins can be produced by reaction of a monomeric bismaleimide with a nucleophile such as a diamine, aminophenol, or amino benzhydrazide, or by reaction of a bismaleimide with diallyl bisphenol A. The thermoset resin can be a vinyl resin. A vinyl resin is a monomer or polymer having ethylenic unsaturation. Examples of vinyl resins include unsaturated polyesters, styrenic monomers, (meth)acrylates, allyl ethers, vinyl ethers, and combinations comprising at least one of the foregoing.

A cured composition is obtained by heating the curable composition defined herein for a time and temperature sufficient to effect curing. In curing, a cross-linked, three-dimensional polymer network is formed. For certain thermoset resins, for example (meth)acrylate resins, curing can also take place by irradiation with actinic radiation at a sufficient wavelength and time.

Due to the presence of the poly(phenylene ether) copolymer, the cured composition can any of several beneficial physical properties that are useful in various articles, including good impact strength, hydrolytic stability, low moisture absorption, high $T_g$, and good dielectric properties. Thus, an article can comprise the cured composition obtained by heating the curable composition defined herein for a time and temperature sufficient to effect curing.

This disclosure is further illustrated by the following embodiments, which are not intended to limit the claims.

Embodiment 1: A process for forming a poly(phenylene ether) copolymer, the process comprising: reacting a monohydric phenol comprising 2-methyl-6-phenylphenol and a dihydric phenol in the presence of molecular oxygen, a polymerization catalyst comprising a metal ion and at least one amine ligand, and a solvent to form a copolymer of 2-methyl-6-phenylphenol and the dihydric phenol; wherein the copolymer has an absolute number average molecular weight of 1,000 to 10,000 grams/mole; and wherein the solvent comprises, based on the total weight of the solvent, at least 95 weight percent of a $C_1$-$C_3$ alcohol selected from the group consisting of methanol, ethanol, 1-propanol, and 2-propanol.

Embodiment 2. The process of embodiment 1, wherein the polymerization catalyst comprises copper ion, bromide ion, and N,N'-di-tert-butylethylenediamine.

Embodiment 3. The process of embodiment 1 or 2, wherein the monohydric phenol comprises, based on the total weight of monohydric phenol and dihydric phenol, less than 0.5 weight percent of monohydric phenols having identical substituents in the 2- and 6-positions of the phenolic ring.

Embodiment 4. The process of any of embodiments 1 to 3, wherein the copolymer has an absolute number average molecular weight of 1,000 to 5,000 grams/mole.

Embodiment 5. The process of any of embodiments 1 to 4, wherein the copolymer comprises 80 to 99 weight percent of repeat units derived from the monohydric phenol and 1 to 20 weight percent of repeat units derived from the dihydric phenol.

Embodiment 6. The process of any of embodiments 1 to 5, wherein the dihydric phenol has the structure:

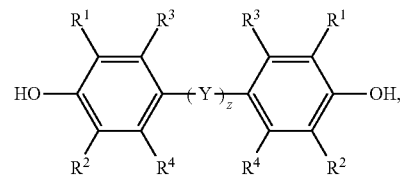

wherein each occurrence of $R^1$ and $R^2$ and $R^3$ and $R^4$ is independently selected from the group consisting of hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, and $C_2$-$C_{12}$ halohydrocarbyloxy wherein at least two carbon atoms separate the halogen and oxygen atoms; z is 0 or 1; and Y is selected from the group consisting of

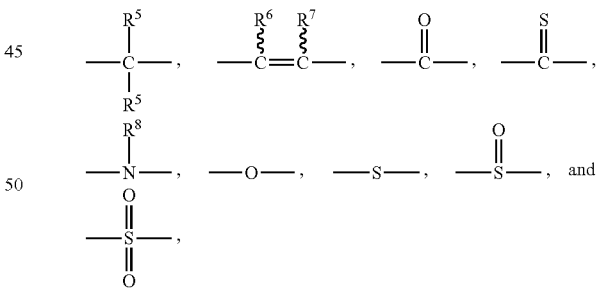

wherein each occurrence of $R^5$-$R^8$ is independently hydrogen, $C_1$-$C_{12}$ hydrocarbyl, or $C_1$-$C_6$ hydrocarbylene wherein the two occurrences of $R^5$ collectively form a $C_4$-$C_{12}$ alkylene group.

Embodiment 7. The process of embodiment 6, wherein z is 1.

Embodiment 8. The process of any of embodiments 1 to 7, wherein the dihydric phenol comprises 2,2-bis(3,5-dimethyl-4-hydroxyphenol)propane.

Embodiment 9. The process of any of embodiments 1 to 8, wherein the amine ligand comprises a di($C_1$-$C_6$-alkyl)amine; and wherein the copolymer of 2-methyl-6-phenylphenol and the dihydric phenol comprises less than 0.005 weight percent of di($C_1$-$C_6$-alkyl)amino groups, based on the weight of the copolymer.

Embodiment 10. The process of any of embodiments 1 to 9, wherein the solvent comprises at least 99 weight percent methanol.

Embodiment 11. The process of any of embodiments 1 to 10, wherein: the dihydric phenol comprises 2,2-bis(3,5-dimethyl-4-hydroxyphenol)propane; the at least one amine ligand comprises di(n-butyl)amine; the solvent comprises at least 99 weight percent methanol; and the copolymer of 2-methyl-6-phenylphenol and the dihydric phenol comprises less than 0.005 weight percent of di(n-butyl)amino groups, based on the weight of the copolymer.

Embodiment 12. A poly(phenylene ether) copolymer derived from a monohydric phenol comprising 2-methyl-6-phenylphenol and a dihydric phenol, wherein the copolymer has an absolute number average molecular weight of 1,000 to 10,000 grams/mole.

Embodiment 13. The poly(phenylene ether) copolymer of embodiment 12, wherein the monohydric phenol comprises, based on the total weight of monohydric phenol and dihydric phenol, less than 0.5 weight percent of monohydric phenols having identical substituents in the 2- and 6-positions of the phenolic ring.

Embodiment 14. The poly(phenylene ether) copolymer of embodiment 12, wherein the copolymer has an absolute number average molecular weight of 1,000 to 5,000 grams/mole.

Embodiment 15. The poly(phenylene ether) copolymer of any of embodiments 12 to 14, wherein the copolymer comprises 80 to 99 weight percent of repeat units derived from the monohydric phenol and 1 to 20 weight percent of repeat units derived from the dihydric phenol.

Embodiment 16. A poly(phenylene ether) copolymer having the structure:

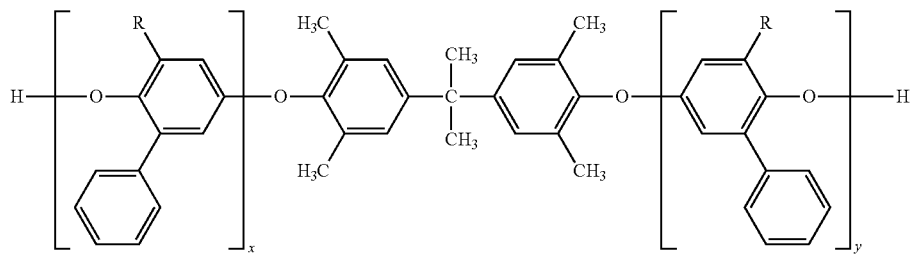

wherein: R is independently at each occurrence methyl or di(n-butyl)aminomethyl; provided that the copolymer comprises, on average, less than or equal to 0.005 weight percent of di(n-butyl)aminomethyl groups, based on the weight of the copolymer; and x and y are independently at each occurrence zero to 50, provided that the sum of x and y is 4 to 53.

Embodiment 17. The poly(phenylene ether) copolymer of embodiment 16, wherein the sum of x and y is 8 to 20.

Embodiment 18. A curable composition, comprising a thermosetting resin and the poly(phenylene ether) copolymer of embodiment 12.

Embodiment 19. A cured composition obtained by heating the curable composition of embodiment 18 for a time and temperature sufficient to effect curing.

Embodiment 20. An article comprising the cured composition of embodiment 19.

The disclosure is further illustrated by the following examples, which are not intended to limit the claims.

WORKING EXAMPLES

Chemicals used in the working examples are summarized in Table 1.

TABLE 1

| Component | Description |
|---|---|
| MPP | 2-Methyl-6-phenylphenol, CAS Reg. No. 17755-10-1; obtained from SI Group, Inc. |
| TMBPA | 2,2-bis(3,5-dimethyl-4-hydroxyphenyl)propane, CAS Reg. No. 5613-46-7; obtained from Deepak Novochem. |
| $Cu_2O$ | Cuprous oxide, CAS Reg. No. 1317-39-1; obtained from American Chemet Corporation. |
| HBr | Hydrobromic acid, CAS Reg. No. 10035-10-6; obtained from Chemtura Corporation. |

TABLE 1-continued

| Component | Description |
|---|---|
| DBEDA | Di-tert-butylethylenediamine. CAS Reg. No. 4062-60-6; obtained from Achiewell, LLC. |
| DBA | Di-n-butylamine, CAS Reg. No. 111-92-2; obtained from Oxea. |
| DMBA | N,N-Dimethylbutylamine, CAS Reg. No. 927-62-8; obtained from Oxea. |
| DDMAC | N,N,N',N'-Didecyldimethyl ammonium chloride, CAS Reg. No. 7173-51-5; obtained as MAQUAT ™ 4450T from Mason Chemical Company. |
| $Na_3NTA$ | Nitrilotriacetic acid trisodium salt, CAS Reg. No. 5064-31-3; obtained from Akzo Nobel Functional Chemical, LLC. |
| Methanol | Methanol, CAS Reg. No. 67-56-1; obtained from Fisher Scientific. |
| Toluene | Toluene, CAS Reg. No. 108-88-3; obtained from Fisher Scientific. |

Example 1

This example describes synthesis of a low molecular weight copolymer of MPP and DMBPA by precipitation polymerization. 15.2 grams MPP, 2.06 grams TMBPA, 155 grams methanol, 0.17 grams DBA, 1.55 grams DMBA, and 0.12 grams of a diamine mix consisting of 30 weight percent DBEDA, 15 weight percent DDMAC, and the balance toluene, were charged to a bubbling polymerization vessel and stirred at ambient atmosphere. A mix of 0.16 grams aqueous HBr (48 weight percent) and 0.0126 grams $Cu_2O$ was added. Air was bubbled through tubing near the bottom of the reactor and the contents of the reactor were agitated with an overhead agitator at 400 rotations per minute (rpm). The gas flow was allowed to exit the reactor through a condenser. The temperature was maintained at 25° C. Precipitation was observed within 10 minutes. Air bubbling maintained for 120 minutes and the precipitated polymer particles were filtered. The particles were then added to 5 grams of a 20 weight percent solution of $Na_3NTA$ in deionized water and dispersed for 1 hour on a wrist shaker. The dispersed particles were allowed to stand overnight and were then filtered and washed with deionized water. The copolymer was obtained as a dry powder after drying overnight in a vacuum oven at 110° C.

Example 2

This example describes synthesis of a low molecular weight copolymer of MPP and DMBPA by precipitation polymerization using multiple polymer recovery steps. 15.2 grams MPP, 2.06 grams TMBPA, 155 grams methanol, 0.17 grams DBA, 1.55 grams DMBA, and 0.12 grams of a diamine mix consisting of 30 weight percent DBEDA, 15 weight percent DDMAC, and the balance toluene, were charged to a bubbling polymerization vessel and stirred at ambient atmosphere. A mix of 0.16 grams aqueous HBr (48 weight percent) and 0.0126 grams $Cu_2O$ was added. Air was bubbled through tubing near the bottom of the reactor and the contents of the reactor were agitated with an overhead agitator at 400 rotations per minute (rpm). The gas flow was allowed to exit the reactor through a condenser. The temperature was maintained at 25° C. Precipitation was observed within 10 minutes. After 30 minutes, the precipitated particles were filtered, and the filtrate was transferred back into the reactor. After 30 minutes of bubbling air, newly precipitated particles were filtered. The filtrate was put back into the reactor and after 3 hours a second crop of particles was filtered. The first and second crops of particles were each individually added to 5 grams of a 20 weight percent solution of $Na_3NTA$ in deionized water and dispersed for 1 hour on a wrist shaker. The dispersed particles were allowed to stand overnight and were then filtered and washed with deionized water. The copolymer was obtained as a dry powder after drying overnight in a vacuum oven at 110° C.

Comparative Example 1

This example describes synthesis of a low molecular weight copolymer of MPP and DMBPA by homogeneous polymerization. 723.2 grams toluene, 272.7 grams MPP, 37.2 grams TMBPA, 7.23 gram DMBA, 3.10 gram DBA, and a mixture of 0.49 gram DBEDA, 0.26 gram DDMAC, and 0.88 gram toluene were charged to a 1.8 liter bubbling polymerization vessel and stirred under nitrogen. 2.32 grams catalyst solution (0.17 gram $Cu_2O$ and 2.15 grams 48 weight percent aqueous HBr) was added to the above reaction mixture. After the addition of catalyst solution, oxygen flow was started. The temperature was ramped from 25° C. to 39.4° C. in 15 minutes, and at 70 minutes it was increased to 48.9° C. Oxygen flow was maintained for 130 minutes, at which point the flow was stopped, and 1.88 grams $Na_3NTA$ and 5.41 grams water were added to the reaction mixture. The resulting mixture was stirred at 60° C. for 2 hours. The layers were separated by centrifugation and copolymer was isolated from the light (organic) phase by removing volatiles (primarily toluene), and drying overnight in a vacuum oven at 110° C. under vacuum with a nitrogen purge.

Copolymer Characterization

The MPP/TMBPA copolymer has the structure below:

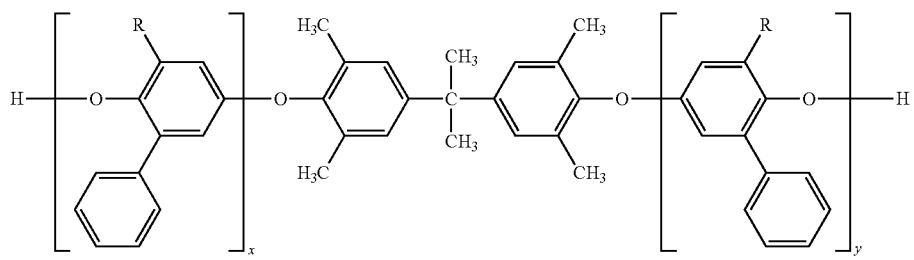

wherein R is independently at each occurrence —CH₃ or —CH₂N(CH₂CH₂CH₂CH₃)₂, and x and y are each independently 0 to 25, provided that the sum of x and y is, on average, 3-50. Table 2 summarizes the properties of the copolymers synthesized via precipitation polymerization and homogeneous polymerization reactions. In Table 2, "Intrinsic Viscosity (dL/g)" is the intrinsic viscosity, expressed in units of deciliters per gram, measured at 25° C. in chloroform by Ubbelohde viscometry; "Average functionality" is the average number of phenolic hydroxyl end groups per molecule, as determined by ¹H-NMR spectroscopy; "Mannich Amines (wt %)" is the content of di-n-butylamino groups incorporated into the poly(phenylene ether), expressed as weight percent based on the weight of poly(phenylene ether), and determined by ¹H-NMR spectroscopy; "Absolute $M_n$ (g/mol)" is the absolute number average molecular weight expressed in units of grams/mole and determined by ¹H-NMR spectroscopy; "$X_n$" is average degree of polymerization per molecule, expressed as the average sum of MPP repeat units and one TMBPA repeat unit, and was calculated from $M_n$; "$T_g$ (° C.) 1st scan" and "$T_g$ (° C.) 2nd scan" are glass transition temperatures, expressed in degrees centigrade, measured by differential scanning calorimetry over first and second heating scans, each at a heating rate of 10° C. per minute over a range of 30 to 200° C. The results show that copolymers synthesized by the two methods exhibit similar intrinsic viscosity, absolute number average molecular weight, and glass transition temperature. Unexpectedly, copolymers prepared by precipitation polymerization have very low Mannich amine content compared to copolymers synthesized in toluene.

TABLE 2

| Property | Ex. 1 | C. Ex. 1 |
| --- | --- | --- |
| Intrinsic Viscosity (dL/g) | 0.051 | 0.062 |
| Average functionality | 2.0 | 2.0 |
| Mannich Amines (wt %) | 0.002 | 0.66 |
| Absolute $M_n$ (g/mol) | 2745 | 2875 |
| $X_n$ | 14 | 14 |
| $T_g$ (° C.) 1st scan | 119 | 119 |
| $T_g$ (° C.) 2nd scan | 116 | 114 |

Table 3 presents results from the Example 2 precipitation process in which precipitated particles were removed stepwise from the polymerization medium. In Table 3, "Sample Description" is the time, expressed in minutes or hours, at which the powder sample was isolated from the reaction mixture; "Incorp. TMBPA (wt %)" is the weight percent of TMBPA incorporated into the poly(phenylene ether) copolymer based on the weight of poly(phenylene ether) copolymer; "Free TMBPA (wt %)" is the weight percent of free (unincorporated) TMBPA based on the weight of the filtrate separated from the powder sample; and "OH End Groups (wt %)" is the weight percent of hydroxyl end groups in the poly(phenylene ether) copolymer based on the weight of the poly(phenylene ether) copolymer.

"Absolute $M_n$ (g/mol)" is the absolute number average molecular weight, "Average functionality" is the average number of phenolic hydroxyl end groups per molecule, and "$X_n$" is average degree of polymerization, i.e. the average number of MPP and/or DMP repeat units per molecule plus one TMBPA unit. These parameters were all determined by ¹H-NMR spectroscopy. "Absolute $M_n$ (g/mol)" is based on the integrated areas under the resonance peaks in ¹H-NMR spectra of the poly(phenylene ether) copolymers, which are proportional to the molar concentration of the species corresponding to the peaks. In particular, the determination of $M_n$ is equivalent to dividing the total weight of a given sample of the polymer (which is proportional to the total area under the ¹H-NMR peak of species) by the total number of its constituent molecules. In other words, $M_n$ equals the sum of all component integrals multiplied by their molecular weight divided by the sum of all terminal component integrals divided by their number of equivalent protons and multiplied by two. The components for MPP/TMBPA copolymers include the TMBPA internal unit, TMBPA terminal unit, MPP repeat unit, MPP head unit, internal MPP biphenyl unit, MPP tail unit, and Mannich di-n-butylamino MPP head unit. The terminal components include TMBPA terminal unit, MPP head unit, MPP tail unit, and di-n-butylamino MPP head unit.

The results of Table 3 suggest that it may be possible to prepare bifunctional, low molecular weight, poly(phenylene ether)s via a continuous precipitation polymerization process in methanol.

TABLE 3

| Sample Description | Absolute $M_n$ (g/mol) | Average Functionality | Incorp. TMBPA (wt. %) | Free TMBPA (wt. %) | OH End Groups (wt. %) | Mannich Amines (wt. %) |
| --- | --- | --- | --- | --- | --- | --- |
| Powder, 30 min | 2843 | 2 | 14.68 | 0.16 | 1.19 | a |
| Powder, 60 min | 2860 | 2 | 14.48 | 0.12 | 1.18 | a |
| Powder, 3 hr | 2975 | 2 | 13.22 | 0.12 | 1.14 | a | a Detectable, but less than 100 ppm.

The compositions, methods, and articles can alternatively comprise, consist of, or consist essentially of, any appropriate materials, steps, or components herein disclosed. The compositions, methods, and articles can additionally, or alternatively, be formulated so as to be devoid, or substantially free, of any materials (or species), steps, or components, that are otherwise not necessary to the achievement of the function or objectives of the compositions, methods, and articles.

All ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). "Combinations" is inclusive of blends, mixtures, alloys, reaction products, and the like. The terms "first," "second," and the like, do not denote any order, quantity, or importance, but rather are used to distinguish one element from another. The terms "a" and "an" and "the" do not denote a limitation of quantity, and are to be construed to cover both the singular and the plural, unless otherwise indicated herein or clearly contradicted by context. "Or" means "and/or" unless clearly stated otherwise. Reference throughout the specification to "some embodiments", "an embodiment", and so forth, means that a particular element described in connection with the embodiment is included in at least one embodiment described herein, and may or may not be present in other embodiments. In addition, it is to be understood that the described elements can be combined in any suitable manner in the various embodiments.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this application belongs. All cited patents, patent applications, and other references are incorporated herein by reference in their entirety. However, if a term in the present application contradicts or conflicts with a term in the incorporated reference, the term from the present application takes precedence over the conflicting term from the incorporated reference.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group.

The term "hydrocarbyl" refers to a monovalent group containing carbon and hydrogen. Hydrocarbyl can be alkyl, cycloalkyl, alkenyl, cycloalkenyl, aryl, alkylaryl, or arylalkyl as defined below. The term "hydrocarbylene" refers to a divalent group containing carbon and hydrogen. Hydrocarbylene can be alkylene, cycloalkylene, arylene, alkylarylene, or arylalkylene as defined below. The term "alkyl" means a branched or straight chain, unsaturated aliphatic hydrocarbon group, e.g., methyl, ethyl, n-propyl, i-propyl, n-butyl, s-butyl, t-butyl, n-pentyl, s-pentyl, and n- and s-hexyl. "Alkenyl" means a straight or branched chain, monovalent hydrocarbon group having at least one carbon-carbon double bond (e.g., ethenyl (—HC=CH$_2$)). "Alkoxy" means an alkyl group that is linked via an oxygen (i.e., alkyl-O—), for example methoxy, ethoxy, and sec-butyloxy groups. "Alkylene" means a straight or branched chain, saturated, divalent aliphatic hydrocarbon group (e.g., methylene (—CH$_2$—) or, propylene (—(CH$_2$)$_3$—)). "Cycloalkylene" means a divalent cyclic alkylene group, —C$_n$H$_{2n-x}$—, wherein x is the number of hydrogens replaced by cyclization(s). "Cycloalkenyl" means a monovalent group having one or more rings and one or more carbon-carbon double bonds in the ring, wherein all ring members are carbon (e.g., cyclopentenyl and cyclohexenyl). "Aryl" means an aromatic hydrocarbon group containing the specified number of carbon atoms, such as phenyl, tropone, indanyl, or naphthyl. "Arylene" means a divalent aryl group. "Alkylarylene" means an arylene group substituted with an alkyl group. "Arylalkylene" means an alkylene group substituted with an aryl group. The prefix "halo" means a group or compound including one more of a fluoro, chloro, bromo, or iodo substituent. A combination of different halo groups (e.g., bromo and fluoro), or only chloro groups can be present. The prefix "hetero" means that the compound or group includes at least one ring member that is a heteroatom (e.g., 1, 2, or 3 heteroatom(s)), wherein the heteroatom(s) is each independently N, O, S, Si, or P. The suffix "oxy" indicates that the open valence of the group is on an oxygen atom and the suffix "thio" indicates that the open valence of the group is on a sulfur atom.

Unless substituents are otherwise specifically indicated, each of the foregoing groups can be unsubstituted or substituted, provided that the substitution does not significantly adversely affect synthesis, stability, or use of the compound. "Substituted" means that the compound, group, or atom is substituted with at least one (e.g., 1, 2, 3, or 4) substituents instead of hydrogen, where each substituent is independently nitro (—NO$_2$), cyano (—CN), hydroxy (—OH), halogen, thiol (—SH), thiocyano (—SCN), C$_{1-6}$ alkyl, C$_{2-6}$ alkenyl, C$_{2-6}$ alkynyl, C$_{1-6}$ haloalkyl, C$_{1-9}$ alkoxy, C$_{1-6}$ haloalkoxy, C$_{3-12}$ cycloalkyl, C$_{5-18}$ cycloalkenyl, C$_{6-12}$ aryl, C$_{7-13}$ arylalkylene (e.g., benzyl), C$_{7-12}$ alkylarylene (e.g, toluyl), C$_{4-12}$ heterocycloalkyl, C$_{3-12}$ heteroaryl, C$_{1-6}$ alkyl sulfonyl (—S(=O)$_2$-alkyl), C$_{6-12}$ arylsulfonyl (—S(=O)$_2$-aryl), or tosyl (CH$_3$C$_6$H$_4$SO$_2$—), provided that the normal valence of the substituted atom is not exceeded, and that the substitution does not significantly adversely affect the manufacture, stability, or desired property of the compound. When a compound is substituted, the indicated number of carbon atoms is the total number of carbon atoms in the compound or group, including those of any substituents.

While particular embodiments have been described, alternatives, modifications, variations, improvements, and substantial equivalents that are or may be presently unforeseen may arise to applicants or others skilled in the art. Accordingly, the appended claims as filed and as they can be amended are intended to embrace all such alternatives, modifications variations, improvements, and substantial equivalents.

The invention claimed is:

1. A process for forming a poly(phenylene ether) copolymer, the process comprising:
reacting a monohydric phenol comprising 2-methyl-6-phenylphenol and a dihydric phenol in the presence of molecular oxygen, a polymerization catalyst comprising a metal ion and at least one amine ligand, and a solvent to form a copolymer of 2-methyl-6-phenylphenol and the dihydric phenol; wherein:
the monohydric phenol comprises, based on the total weight of monohydric phenol and dihydric phenol, less than 0.5 weight percent of monohydric phenols having identical substituents in the 2- and 6-positions of the phenolic ring;
the copolymer comprises less than 0.005 weight percent of di(C$_1$-C$_6$-alkyl)amino groups, based on the weight of the copolymer;
the copolymer has an absolute number average molecular weight of 1,000 to 10,000 grams/mole, calculated from integrated areas under resonance peaks in the $^1$H-NMR spectrum of the copolymer; and
the solvent comprises, based on the total weight of the solvent, at least 95 weight percent of a C$_1$-C$_3$ alcohol selected from the group consisting of methanol, ethanol, 1-propanol, and 2-propanol.

2. The process of claim 1, wherein the polymerization catalyst comprises copper ion, bromide ion, and N,N'-di-tert-butylethylenediamine.

3. The process of claim 1, wherein the copolymer has an absolute number average molecular weight of 1,000 to 5,000 grams/mole.

4. The process of claim 1, wherein the copolymer comprises 80 to 99 weight percent of repeat units derived from the monohydric phenol and 1 to 20 weight percent of repeat units derived from the dihydric phenol.

5. The process of claim 1, wherein the dihydric phenol has the structure:

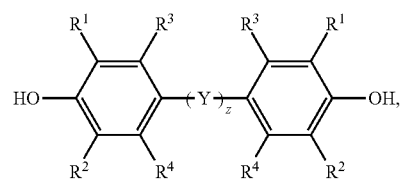

wherein each occurrence of $R^1$ and $R^2$ and $R^3$ and $R^4$ is independently selected from the group consisting of hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, and $C_2$-$C_{12}$ halohydrocarbyloxy wherein at least two carbon atoms separate the halogen and oxygen atoms; z is 0 or 1; and Y is selected from the group consisting of

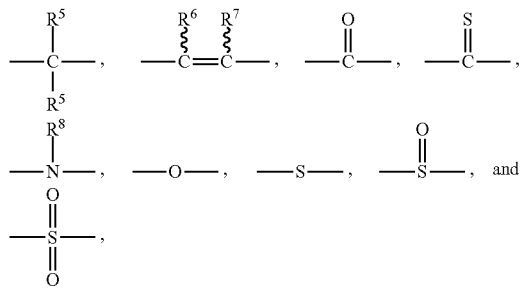

wherein each occurrence of $R^5$-$R^8$ is independently hydrogen, $C_1$-$C_{12}$ hydrocarbyl, or $C_1$-$C_6$ hydrocarbylene wherein the two occurrences of $R^5$ collectively form a $C_4$-$C_{12}$ alkylene group.

6. The process of claim 5, wherein z is 1.

7. The process of claim 1, wherein the dihydric phenol comprises 2,2-bis(3,5-dimethyl-4-hydroxyphenol)propane.

8. The process of claim 1, wherein the amine ligand comprises a di($C_1$-$C_6$-alkyl)amine; and wherein the copolymer of 2-methyl-6-phenylphenol and the dihydric phenol comprises less than 0.005 weight percent of di($C_1$-$C_6$-alkyl) amino groups, based on the weight of the copolymer.

9. The process of claim 1, wherein the solvent comprises at least 99 weight percent methanol.

10. The process of claim 1, wherein:
the dihydric phenol comprises 2,2-bis(3,5-dimethyl-4-hydroxyphenol)propane;
the at least one amine ligand comprises di(n-butyl)amine;
the solvent comprises at least 99 weight percent methanol; and
the copolymer of 2-methyl-6-phenylphenol and the dihydric phenol comprises less than 0.005 weight percent of di(n-butyl)amino groups, based on the weight of the copolymer.

11. A poly(phenylene ether) copolymer derived from a monohydric phenol comprising 2-methyl-6-phenylphenol and a dihydric phenol, wherein:
the monohydric phenol comprises, based on the total weight of monohydric phenol and dihydric phenol, less than 0.5 weight percent of monohydric phenols having identical substituents in the 2- and 6-positions of the phenolic ring;
the copolymer comprises less than 0.005 weight percent of di($C_1$-$C_6$-alkyl)amino groups, based on the weight of the copolymer; and
the copolymer has an absolute number average molecular weight of 1,000 to 10,000 grams/mole, calculated from integrated areas under resonance peaks in the $^1$H-NMR spectrum of the copolymer.

12. The poly(phenylene ether) copolymer of claim 11, wherein the copolymer has an absolute number average molecular weight of 1,000 to 5,000 grams/mole.

13. The poly(phenylene ether) copolymer of claim 11, wherein the copolymer comprises 80 to 99 weight percent of repeat units derived from the monohydric phenol and 1 to 20 weight percent of repeat units derived from the dihydric phenol.

14. A poly(phenylene ether) copolymer having the structure:

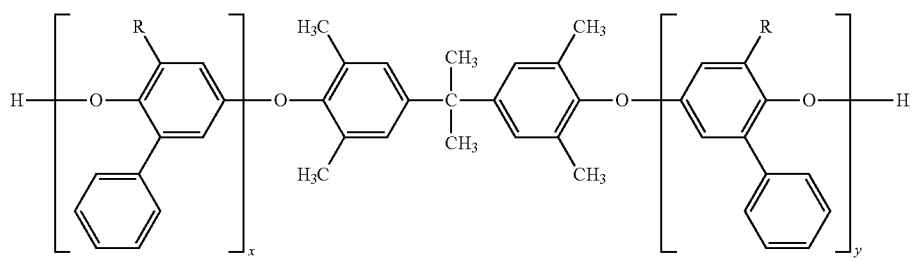

wherein:
R is independently at each occurrence methyl or di(n-butyl)aminomethyl; provided that the copolymer comprises, on average, less than or equal to 0.005 weight percent of di(n-butyl)aminomethyl groups, based on the weight of the copolymer; and
x and y are independently at each occurrence zero to 50, provided that the sum of x and y is 4 to 53.

15. The poly(phenylene ether) copolymer of claim 14, wherein the sum of x and y is 8 to 20.

16. A curable composition, comprising a thermosetting resin and the poly(phenylene ether) copolymer of claim 11.

17. A cured composition obtained by heating the curable composition of claim 16 for a time and temperature sufficient to effect curing.

18. An article comprising the cured composition of claim 17.

* * * * *